United States Patent [19]
Park

[11] Patent Number: 5,863,008
[45] Date of Patent: *Jan. 26, 1999

[54] GEAR AND A POWER DELIVERING APPARATUS USING THEREOF

[75] Inventor: Hyeok Soo Park, Kyungki-do, Rep. of Korea

[73] Assignee: LG Electronics, Inc., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 769,057

[22] Filed: Dec. 18, 1996

[30] Foreign Application Priority Data

Dec. 18, 1995 [KR] Rep. of Korea .................. 1995 43147

[51] Int. Cl.$^6$ .............................. G11B 15/32; G11B 5/008
[52] U.S. Cl. .................... 242/356; 360/96.3; 74/DIG. 10
[58] Field of Search .......................... 242/356; 360/96.3; 74/DIG. 10

[56] References Cited

U.S. PATENT DOCUMENTS 3,361,004  1/1968  Williams et al. .................. 74/DIG. 10
5,452,622  9/1995  Fenelon ............................. 74/DIG. 10

FOREIGN PATENT DOCUMENTS 405018455  1/1993  Japan ............................... 74/DIG. 10

*Primary Examiner*—John Q. Nguyen

[57] ABSTRACT

A gear for power delivering apparatus comprises body unit, gear unit engaging with another gear at the outer periphery of the body unit, and impact absorbing member between the body unit and the gear unit. The impact absorbing member, including space between the body unit and the gear unit and a plurality of arms in space, absorbs the impact applied to teeth of the gear unit. The arms are helically formed, so that absorption of the impact applied to the gear depends on the rotation direction of the gear.

9 Claims, 5 Drawing Sheets

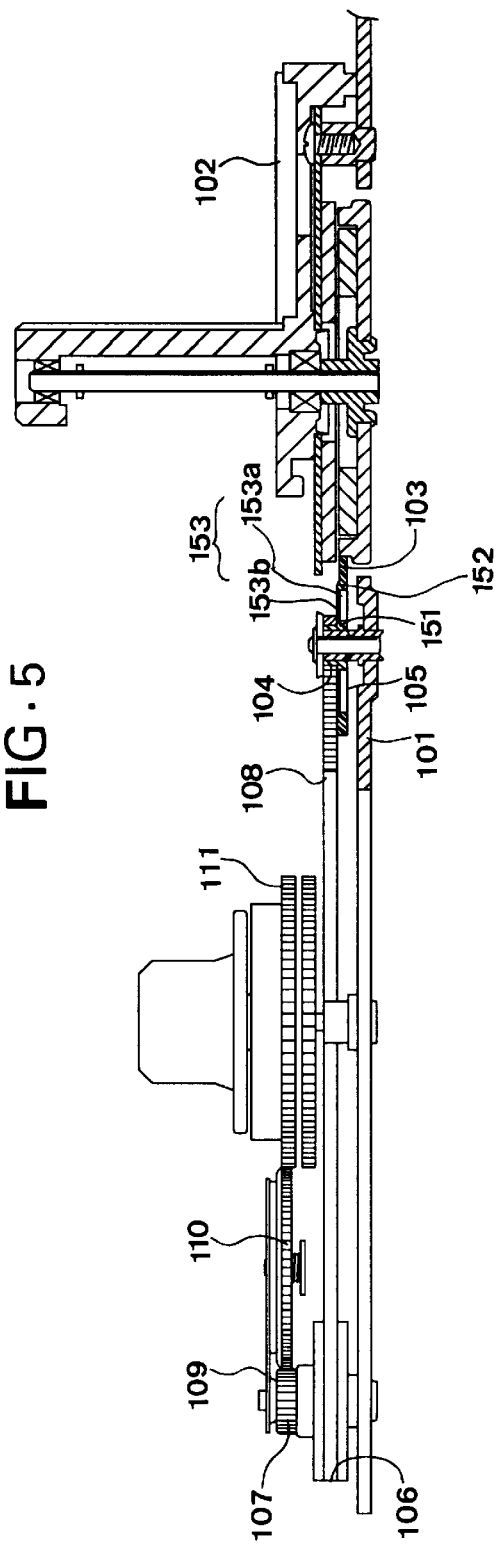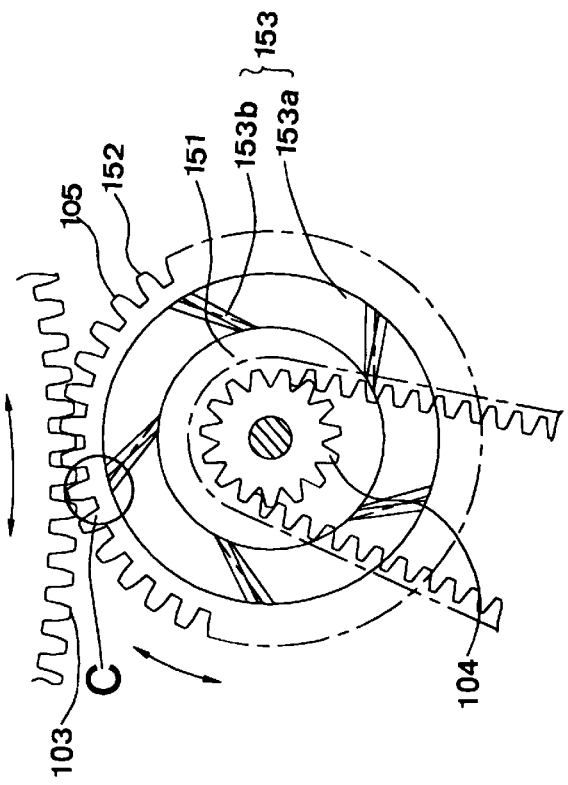

| MODE | PRIOR ART | THIS INVENTION |
|---|---|---|
| RECORDING AND REPRODUCING MODE | 51.4 dB | 46.5 dB |
| FAST WINDING MODE | 58.2 dB | 51.4 dB |
| FAST WINDING MODE | 65.2 dB | 55.5 dB |

GEAR AND A POWER DELIVERING APPARATUS USING THEREOF

BACKGROUND OF THE INVENTION

The present invention relates to a power delivering apparatus, and more particularly to a gear for the power delivering apparatus of magnetic recording and reproducing system in which impact damage to the gear is prevented and noise caused by friction between the teeth of the gears is decreased.

In a conventional magnetic recording and reproducing system, when the recording mode or reproducing mode is selected, a magnetic tape in a cassette is pulled out by a tape taking device and placed on contact with a magnetic head. At the same time, a mechanical power delivering apparatus is operated to transmit the power to a hub within the cassette to drive the tape, the magnetic head records signal or reproduces the recorded signal according to the selected mode.

When the stop mode is selected or the recording or reproducing of the signal is otherwise finished, the tape is stopped and again taken into the cassette by the tape taking device.

FIGS. 1 and 2 are views showing a conventional power delivering apparatus for a recording and reproducing system. As shown in figures, a capstan motor 2 is mounted within main base 1 and a capstan gear 3 is axially mounted on the capstan motor 2. In the upper side of the main base 1, a conversion gear 5 in which a first timing gear is integrally formed is mounted so as to engage with the capstan gear 3. In the lower side of the main base 1, a center gear 7 is mounted. Second timing gear 6 is attached to the center gear 7. The first timing gear 4 and the second timing gear 6 are interconnected by a timing belt 8. On the upper end of the shaft of the center gear 7, a rotating lever 9 is mounted rotatably around the shaft. An idle gear 10 engaging the center gear 7 is mounted on the rotating lever 9 so as to be oscillated by the rotation of the center gear 7. On both sides of the idle gear 10, a winding reel 11 and a supplying reel 12 are mounted, so that the turning effect of the idle gear 10 is transmitted to the winding reel 11 and supplying reel 12 during the recording or reproducing mode, and the rewinding mode, respectively.

The conversion gear 5 comprises body unit 51, the first timing gear 4 being attached, and gear unit 52 at the outer periphery of the body unit 51. The gear unit 52 includes a plurality of teeth, so that the conversion gear 5 is engaged with the capstan gear 3.

In the above mentioned apparatus, when the reproducing or recording mode is selected, the magnetic tape is pulled out from the cassette by a tape taking device, not shown in figures, and placed in contact with the magnetic head. At the same time, the capstan motor 2 operates to rotate the capstan gear 3 mounted on the capstan motor 2 counter-clockwise, as shown in FIG. 1. Since the conversion gear 5 is engaged with the capstan gear 3, the conversion gear 5 rotates clockwise and the center gear 7 also rotates clockwise by the turning effect of the conversion gear 5 delivered through the timing belt 7 connecting the first timing gear 4 and the second timing gear 6.

By rotating the center gear 7, the rotating lever mounted at the upper end of the shaft of the center gear 7 rotates, so that the idle gear 10 oscillates in engagement with the winding reel 11. Since the idle gear 10 also engages the center gear 7, it rotates counter-clockwise. As a result, the winding reel 11 rotates clockwise. By this rotation of the winding reel 11, one of the cassette hubs is rotated for recording or reproducing.

In the rewinding mode, especially the fast rewinding mode, the capstan motor 2 is stopped and then driven in reverse to rewind the tape. In this mode, since the idle gear 10 oscillates to be engaged with the supplying reel 12 by the rotation of the rotating lever 9, the turning effect of the idle gear 10 by the reverse driving is delivered to the supplying reel 12 to rewind the tape quickly.

In general, the gears have a gap b between their teeth to permit easy engagement and prevent the effect dimension variations. This gap b causes noise by the friction between the engaging teeth in the fast rewinding mode. Thus, it is necessary to provide an impact absorption device for absorbing impact and decreasing friction between the teeth. In the conventional conversion gear for a power delivering apparatus, since there is no impact absorbing device noise is generated by friction between the engaging gear teeth and the gears are damaged by the impact on the gear teeth.

SUMMARY OF THE INVENTION

An object of the present invention is to provide a gear for delivering power, including impact absorption unit to prevent impact damage to the gear and to decrease noise.

Another object of the present invention is to provide a power delivering apparatus using the gear having an impact absorption unit.

In order to achieve this object, the gear for delivering the power comprise a body unit into which a shaft is inserted, a gear unit located at the outer periphery of the body unit, and an impact absorption unit between the body unit and the gear unit. The impact absorption unit includes space between the body unit and the gear unit and supports in the space for supporting the body unit and the gear unit and absorbing the impact on the gear teeth. The supports include a plurality of helical arms, consisting of an elastic material such as plastic, extending in an approximately perpendicular direction to the impact applied to the gear teeth.

In another aspect of the present invention, the present power delivering apparatus comprises a capstan motor mounted within a main base, a capstan gear axially mounted on the capstan motor, a conversion gear in which first timing gear is integrally formed on an upper side of the main base, a center gear on which second timing gear is mounted on a lower side of the main base, a timing belt connecting the first timing gear and the second timing gear, a rotating lever rotatably mounted at the upper end of a shaft of the center gear, an idle gear, which oscillates according to the rotation of the rotating lever and which is engaged with the center gear, mounted on the rotating lever, and a winding reel and supplying reel engaged with the oscillating idle gear according to a selected operating mode so that the turning effect of the idle gear is transmitted during a recording or reproducing mode and a rewinding mode, respectively.

BRIEF DESCRIPTION OF THE DRAWINGS

FIG. 5 is a sectional view of the power delivering apparatus of magnetic recording and reproducing system according to the present invention.

FIG. 6 is a enlarged view of part B of FIG. 4.

DETAILED DESCRIPTION OF THE INVENTION

Figure 1:
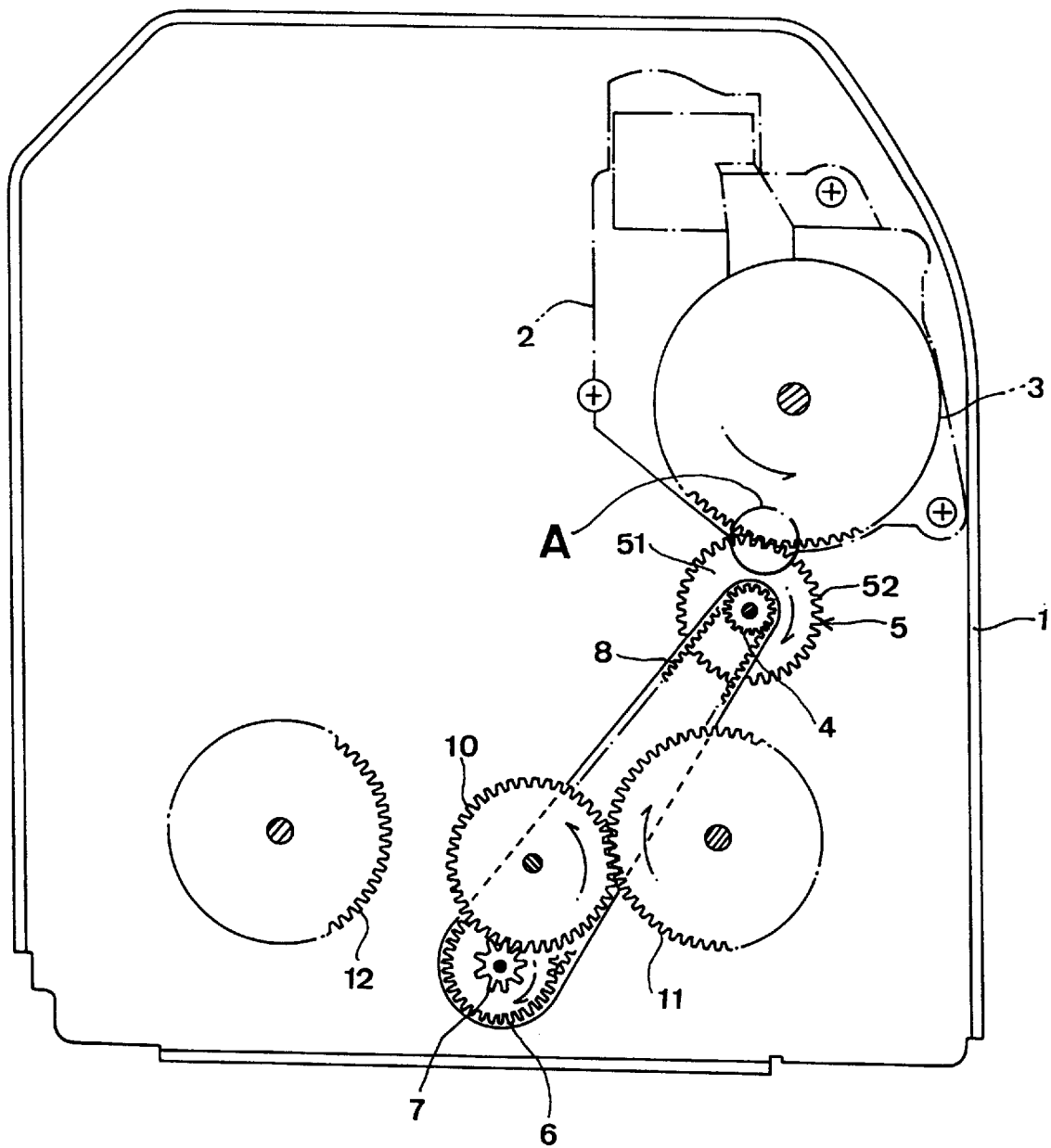
FIG. 1 is a plan view of a conventional power delivering apparatus of a magnetic recording and reproducing system.
Figure 2:
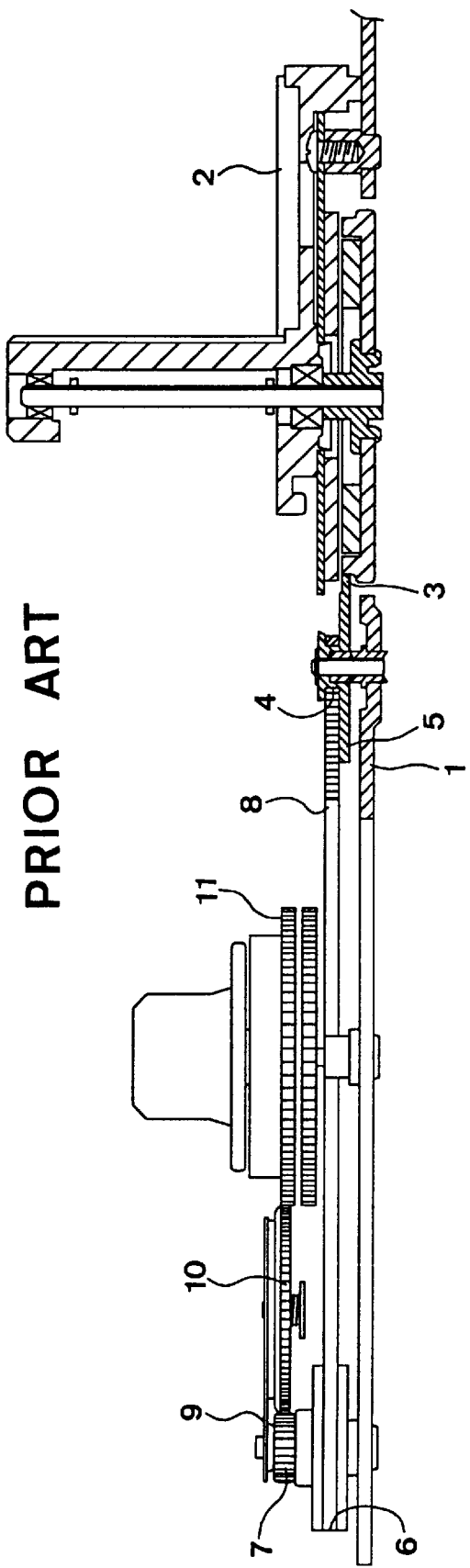
FIG. 2 is a sectional view of the conventional power delivering apparatus of magnetic recording and reproducing system illustrated in FIG. 1.
Figure 3:
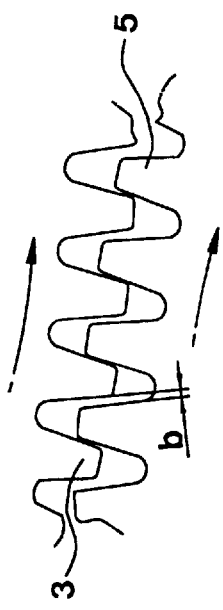
FIG. 3 is a enlarged view of part A of FIG. 1.
Figure 4:
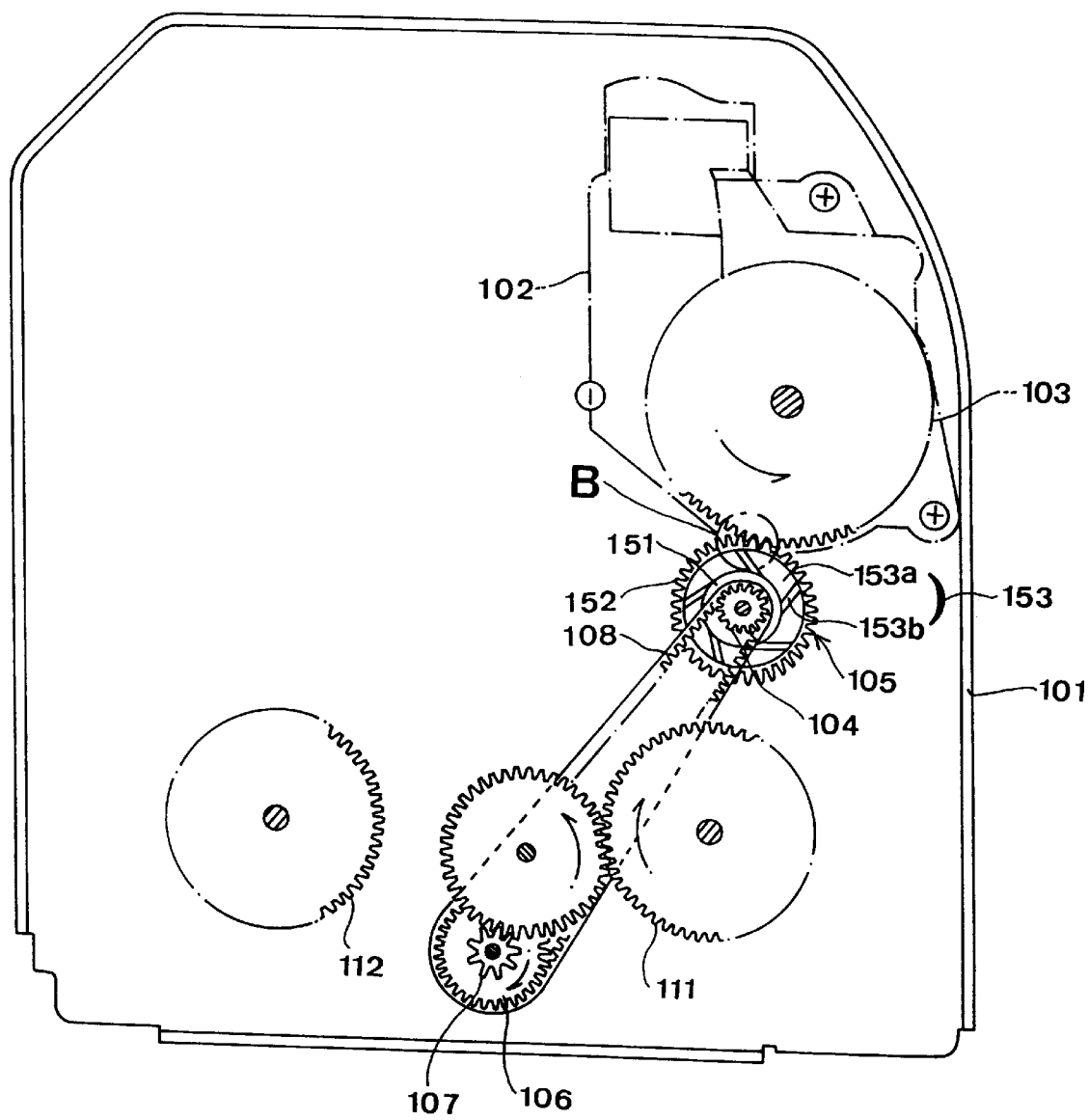
FIG. 4 is a plan view of a the power delivering apparatus of magnetic recording and reproducing system according to the present invention.

Referring to FIG. 4 and 5, a capstan motor 102 is mounted within main base 101, and a capstan gear 103 is axially mounted to the capstan motor 102. On an upper side of the main base 101, a conversion gear 105 in which first timing gear 104 is integrally formed is mounted to be engaged with the capstan gear 103. On a lower side of the main base 101, a center gear 107 is mounted. Second timing gear 106 is attached to the center gear 107. The first timing gear 104 and the second timing gear 106 are interconnected by a timing belt 108. On the upper end of the shaft of the center gear 107, a rotatable lever 109 is mounted. An idle gear 110 engaged with the center gear 107 is mounted on the rotating lever 109 so as to oscillate by the rotation of the center gear 107. On either side of the idle gear 110, a winding reel 111 and a supplying reel 112 are mounted, so that the turning effect of the idle gear 110 is transmitted to the winding reel 111 and supplying reel 112 during the recording or reproducing mode and the rewinding mode, respectively, depending on the position of lever 109.

The conversion gear 105, which is used as a gear for delivering power, includes an elastic material such as plastic. As shown in FIG. 6, conversion gear 105 comprises a body unit 151 on which first timing gear 104 is attached at the center region and through which a shaft is inserted, a gear unit 152, having a plurality of teeth, at the outer periphery of the body unit 151, an and impact absorption unit 153 between the body unit 151 and the gear unit 152. The impact absorption unit 153 includes an empty space 153a formed between the body unit 151 and the gear unit 152 and a plurality of arms 153b mounted in the space 153a for supporting the body unit 151 and the gear unit 152 relative to each other and absorbing the impact applied to the teeth.

In the aforementioned power delivering apparatus, when either the reproducing or recording mode is selected, the magnetic tape is pulled out from the cassette by a tape taking device (not shown in figures) and placed in contact with a magnetic head. At the same time, the capstan motor 102 is operated to rotate the capstan gear 103 counter-clockwise, as shown in FIG. 4. Since the conversion gear 105 is engaged with the capstan gear 103, the conversion gear 105 is rotated clockwise and the center gear 107 is also rotated clockwise by the turning effect of the conversion gear 105 delivered through the timing belt 107 connecting the first timing gear 104 and the second timing gear 106.

By the clockwise rotation of the center gear 107, the rotating lever 109 mounted at the upper end of the shaft of the center gear 107 is rotated, so that the idle gear 110 swings to be engaging with the winding reel 111. Since the idle gear 110 is also engaged with the center gear 107, idle gear 110 rotates counter-clockwise. As a result, the winding reel 111 rotates clockwise. By this clockwise rotation of the winding reel 111, one of the cassette hubs is rotating for either recording or reproducing.

In the rewinding mode, especially the fast rewinding mode, the capstan motor 102 is stopped and then driven in reverse to rewind the tape. In this mode, since the idle gear 110 is swing to be engaged with the supplying reel 112 by the rotation of the rotating lever 109, the turning effect of the idle gear 110 during the reverse driving is delivered to the supplying reel 112 to rewind the tape quickly.

Since the conversion gear 105 include arms 153b made from an elastic material such as plastic, when the gear unit of the capstan gear 103 and the gear unit 152 of the conversion gear 105 engage each other and rotate by the power of the capstan motor 101, as shown in FIG. 6, the arms 153b are elastically bent by the impact applied to the teeth of the conversion gear 105 to absorb this impact, as shown alternate long and short dashed line. Thus, damage to the conversion gear 105 is prevented and noise generation is decreased.

In order to absorb the impact applied to the teeth of the conversion gear 105, the arms 153b are helically inclined in a direction approximately perpendicular to the impact of the teeth of the conversion gear 105. In general, the capstan motor 103 rotates relatively slowly in the recording or reproducing mode, i.e, winding mode), and relatively quickly in rewinding mode. Therefore, the arms 153b are inclined in a direction perpendicular to the impact caused by the rotation of the capstan gear 103 during the rewinding mode.

That is, in the recording or reproducing mode the capstan gear 103 rotates counter-clockwise, so the resultant force Pn, (summing tangential force P and radial force Pt), is directed towards the rotating shaft of the conversion gear 105. Accordingly, the arms 105b are also oriented towards the rotating shaft to generate a repulsive, impact-absorbing force. Accordingly, if little or no bending occurs in arms 153b of conversion gear 105, the rotating torque of the capstan motor can be accurately transmitted in order to accurately proceed in a tape recording or reproducing mode.

In the rewinding mode the capstan gear 103 rotates quickly clockwise, so the larger resultant force Pn' is applied to the teeth of the conversion gear 105. At that time, the helical arms 153b are elastically bent to absorb the force and decrease noise generation.

Figures 7, 8:
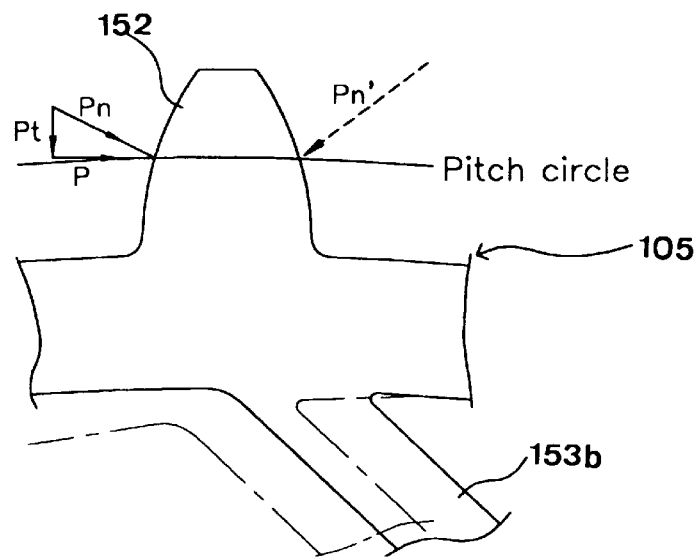
FIG. 7 is a enlarged view of part C of FIG. 6.
FIG. 8 is a table showing the degree of the noise from a power delivering apparatus according to the present invention and the conventional art.

Accordingly, in a rewinding mode in which the tape is rewound by fast rotation, arm 153b undergoes elastic bending and further, the noise of the contact between the teeth of the gear is reduced during the fast rotation. FIG. 8 is a table indicating the degree of the noise generated in the present art and the conventional art. In all operating modes, the noise generated by the present invention is less than the conventional art, as shown in the table. In particular, the noise generated in the fast rewinding mode is greatly decreased because of the inclined direction of the arms 153b.

In the presently described gear for delivering power elastically resilient arms absorb the impact on the gear teeth, so damage to the gear is prevented. In addition, because friction between the engaging gear teeth is decreased, generated noise is also decreased.

While the preferred form of the present invention has been described hereinabove, it is to be understood that modifications will be apparent to those skilled in the art without departing from the spirit of the invention.

The scope of the invention, therefore, is to be determined solely by the following claims.

What is claimed is:

1. A power gear comprising:

a body unit;

a gear unit formed at a periphery of said body unit, said gear unit having a plurality of teeth; and means for absorbing an impact applied to said plurality of teeth and including:

a plurality of straight arms for supporting said body unit and said gear unit, said plurality of arms extending in an oblique radial direction from said body unit to said gear unit and being elastically deformable so as to absorb said impact applied to said plurality of teeth, said deformation depending on a rotation direction of the gear, said plurality of arms being the sole connection between the body unit and the gear unit.

2. A structure for delivering mechanical power in a recording and reproducing system, the structure comprising:

a main base;

means for generating mechanical power within said main base;

a first gear axially mounted to said power generating means, said first gear being driven by the power from said power generating means;

a second gear having impact absorbing means, the second gear including a body unit, a gear unit having teeth, and a plurality of straight arms connecting said body unit and said gear unit, said plurality of arms extending in an oblique radial direction from said body unit to said gear unit and being elastically deformable so as to absorb an impact applied to said plurality of teeth in a direction approximately perpendicular to said arm direction, said deformation depending on a rotation direction of said second gear, said second gear being engaged with said first gear, said plurality of arms being the sole connection between the body unit and the gear unit;

means for delivering power connected to said second gear so as to deliver the power;

a third gear connected to said second gear by way of said power delivering means, said third gear having a shaft;

an oscillating idler means engaged with said third gear, said oscillating idler means rotating about said shaft in accordance with rotation of said third gear; and a winding reel and a supplying reel, the axis of rotation of said oscillating idler means being on a perpendicular bisector of a line connecting the centers of said winding reel and said supplying reel so as to transmit rotation of said third gear to one of said winding and supplying reels.

3. A structure suitable for use as an apparatus for delivering power of a recording and reproducing system according to claim 2, wherein the power delivering means comprises:

a fourth gear axially mounted in the second gear such that the fourth gear is rotated by the turning effect of the second gear;

a fifth gear axially mounted in the third gear and rotating together with the third gear; and means for connecting the fourth gear and the fifth gear so as to deliver the turning effect of the second gear to the third gear through the fourth gear and the fifth gear.

4. A structure suitable for use as an apparatus for delivering power of a recording and reproducing system according to claim 3, wherein the connecting means includes a belt.

5. A structure suitable for use as an apparatus for delivering power of a recording and reproducing system according to claim 3, wherein the fourth gear is integrally mounted in the second gear.

6. A structure suitable for use as an apparatus for delivering power of a recording and reproducing system, the structure comprising:

a main base;

means for generating power within the main base;

a first gear axially mounted to the power generating means such that the first gear is being rotated by the power of the power generating means;

a second gear engaging with the first gear, the second gear including:

a body unit;

a gear unit formed at the outer periphery of the body unit, the gear unit having a plurality of teeth;

space formed between the body unit and the gear unit; and a plurality of elastically deformable arms mounted between the body unit and gear unit, the arms being straightly obliquely radically inclined in the approximately perpendicular direction of the impact applied to the second gear so as to deformably absorb the impact, said plurality of arms being the sole connection between the body unit and the gear unit;

means for delivering power connected to the second gear so as to deliver the power;

a third gear connected to the second gear through the power delivering means, third gear having shaft;

a rotating lever rotatably mounted to the shaft of the third gear;

a fourth gear engaging with the third gear, the fourth gear mounted in the rotating lever, the fourth gear being oscillating around the shaft of the third gear; and a winding reel and a supplying reel, the axis of rotation of the lever being on a perpendicular bisector of a line connecting the centers of the winding reel and the supplying reel so as to transmit the turning effect of the third gear to one of the reels.

7. A structure suitable for use as an apparatus for delivering power of a recording and reproducing system according to claim 6, wherein the power delivering means comprises:

a fifth gear axially mounted in the second gear, such that the fifth gear is being rotated by the turning effect of the second gear;

a sixth gear axially mounted in the third gear and rotating together with the third gear; and means for connecting the fifth gear and the sixth gear so as to deliver the turning effect of the second gear to the third gear through the fifth gear and the sixth gear.

8. A structure suitable for use as an apparatus for delivering power of a recording and reproducing system according to claim 7, wherein the connecting means includes a belt.

9. A structure suitable for use as an apparatus for delivering power of a recording and reproducing system according to claim 7, wherein the fifth gear is integrally mounted in the second gear.

* * * * *